US009848064B2

(12) United States Patent
Dixon et al.

(10) Patent No.: US 9,848,064 B2
(45) Date of Patent: *Dec. 19, 2017

(54) GENERATION AND DISTRIBUTION OF NAMED, DEFINABLE, SERIALIZED TOKENS

(71) Applicant: International Business Machines Corporation, Armonk, NY (US)

(72) Inventors: Bret W. Dixon, South Perth (AU); Benjamin T. Horwood, Northbridge (AU)

(73) Assignee: International Business Machines Corporation, Armonk, NY (US)

( * ) Notice: Subject to any disclaimer, the term of this patent is extended or adjusted under 35 U.S.C. 154(b) by 203 days.

This patent is subject to a terminal disclaimer.

(21) Appl. No.: 14/933,231

(22) Filed: Nov. 5, 2015

(65) Prior Publication Data

US 2017/0134529 A1 May 11, 2017

(51) Int. Cl.
*G06F 15/16* (2006.01)
*H04L 29/06* (2006.01)
*H04L 29/08* (2006.01)

(52) U.S. Cl.
CPC .............. *H04L 67/42* (2013.01); *H04L 67/02* (2013.01); *H04L 67/1097* (2013.01)

(58) Field of Classification Search
CPC ...... H04L 67/42; H04L 67/02; H04L 67/1097
USPC ...................................................... 709/203
See application file for complete search history.

(56) References Cited

U.S. PATENT DOCUMENTS 6,665,814 B2 12/2003 Hobson et al.
7,559,087 B2 7/2009 Pai et al.
7,689,701 B2 3/2010 Hollingsworth
8,504,837 B2 8/2013 Jasper et al.
8,769,290 B1 7/2014 Jacobs
8,898,764 B2 11/2014 Kress et al.
9,473,304 B1 10/2016 Dixon et al.
(Continued)

FOREIGN PATENT DOCUMENTS

WO 0227486 A1 4/2002

OTHER PUBLICATIONS

Indiewebcamp, "token-endpoint," The IndieWeb, Last Modified on Jul. 29, 2015, p. 1-5, https://indiewebcamp.com/token-endpoint, Accessed on Oct. 6, 2015.
(Continued)

*Primary Examiner* — Wing F Chan
*Assistant Examiner* — Joseph Maniwang
(74) *Attorney, Agent, or Firm* — Reza Sarbakhsh

(57) ABSTRACT

A method for generating and distributing serialized tokens is provided. The method may include receiving a request from at least one client. The method may further include determining whether the received at least one request is a request for generating names and definitions for a group of serialized tokens, deleting a names and definitions, and/or receiving a group of serialized tokens. Additionally, the method may include enabling the at least one client to generate names and definitions for a group of serialized tokens. The method may also include storing the names and definitions on a server. The method may also include deleting the names and definitions from the server. The method may also include formatting and distributing serialized tokens based on the names and definitions for the serialized tokens. The method may further include sending a response to the client based on the received request.

20 Claims, 5 Drawing Sheets

(56) References Cited

U.S. PATENT DOCUMENTS

| | | |
|---|---|---|
| 2002/0066051 A1 | 5/2002 | Hobson et al. |
| 2005/0273844 A1 | 12/2005 | Dapkus et al. |
| 2010/0235284 A1 | 9/2010 | Moore |
| 2015/0089623 A1 | 3/2015 | Sondhi et al. |

OTHER PUBLICATIONS

Mell et al., "The NIST Definition of Cloud Computing," National Institute of Standards and Technology, Sep. 2011, p. 1-3, Special Publication 800-145.

Small, "Friendly Unique Id Generation Part 1," Yet Another Chris, Mar. 3, 2009, p. 1-4, London, UK, http://www.anotherchris.net/csharp/friendly-unique-id-generation-part-1/, Accessed on Oct. 6, 2015.

IBM, "List of IBM Patents or Patent Applications Treated as Related (Appendix P)," Jun. 1, 2016, p. 1-2.

Dixon et al., "Generation and Distribution of Named, Definable, Serialized Tokens," Application and Drawings, Filed on Feb. 25, 2016, 31 Pages, U.S. Appl. No. 15/053,430.

Joudeh, "JSON Web Token in asp.net Web API 2 using Owin," Bit of Technology, Oct. 27, 2014, p. 1-32, http://bitoftech.net/2014/10/27/json-web-token-asp-net-web-api-2-jwt-owin-authorization-server/, Accessed on Jun. 7, 2016.

Microsoft, "How to: Create a Custom Token," .NET Framework Documentation, p. 1-16, https://msdn.microsoft.com/en-us/library/ms731872( d=printer,v=vs.11 O).aspx, Accessed on Jun. 7, 2016.

IBM, "List of IBM Patents or Patent Applications Treated as Related (Appendix P)," Nov. 4, 2016, p. 1-2.

Dixon et al., "Generation and Distribution of Named, Definable, Serialized Tokens," Application and Drawings, Filed on Aug. 17, 2016, 31 Pages, U.S. Appl. No. 15/239,011.

IBM: List of IBM Patents or Patent Applications Treated as Related (Appendix P), Jul. 21, 2017, pp. 1-2

Dixon et al., Pending U.S. Appl. No. 15/655,926, filed Jul. 21, 2017, titled Generation and Distribution of Named, Definable, Serialized Tokens, pp. 1-31.

GENERATION AND DISTRIBUTION OF NAMED, DEFINABLE, SERIALIZED TOKENS

BACKGROUND

The present invention relates generally to the field of computing, and more specifically, to serialized tokens.

Generally, in application and software development, tokens may be generated to enable such actions as communication between servers and clients. Typically, tokens are generated based on a specific format and are unique. Serialized tokens are tokens that are typically generated incrementally, or in a series, based on a specific format. Furthermore, the generation of serialized and unique tokens often occurs in a dynamic environment, with multiple concurrent client tasks demanding serialized and unique tokens simultaneously. A common process to client demands of serialized tokens is to use servers to format and generate the serialized tokens and incrementally distribute the serialized tokens as requested by clients so that no two tasks are provided the same serialized token. For example, servers may define the format of the serialized tokens and distribute the tokens incrementally, such as Log-001, Log-002, and Log-003 . . . , to clients as the clients request the tokens to perform software tasks.

SUMMARY

A method for generating and distributing a plurality of serialized tokens is provided. The method may include receiving at least one request from at least one client. The method may include receiving at least one request from at least one client. The method may further include receiving at least one request from at least one client. The method may also include determining whether the received at least one request is a request for generating at least one name and at least one definition for a group of serialized tokens. The method may further include, in response to the determination that the received at least one request is a request for generating the at least one name and the at least one definition for the group of serialized tokens, enabling the at least one client to generate the at least one name and the at least one definition for the group of serialized tokens. Additionally, the method may include storing the generated at least one name and the generated at least one definition on at least one server. The method may also include determining whether the received at least one request is a request for deleting at least one second name and at least one second definition for a second group of serialized tokens. The method may further include, in response to the determination that the received at least one request is a request to delete the at least one second name and the at least one second definition for the second group of serialized tokens, deleting the at least one second name and the at least one second definition for the second group of serialized tokens from the at least one server. The method may also include determining whether the received at least one request is a request for receiving the second group of serialized tokens based on the at least one second name and the at least one second definition. The method may further include, in response to the determination that the received at least one request is a request for receiving the second group of serialized tokens, formatting and distributing the second group of serialized tokens based on the at least one second name and the at least one second definition. The method may also include sending a response to the client based on the received at least one request.

A computer system for generating and distributing a plurality serialized tokens is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving at least one request from at least one client. The method may also include determining whether the received at least one request is a request for generating at least one name and at least one definition for a group of serialized tokens. The method may further include, in response to the determination that the received at least one request is a request for generating the at least one name and the at least one definition for the group of serialized tokens, enabling the at least one client to generate the at least one name and the at least one definition for the group of serialized tokens. Additionally, the method may include storing the generated at least one name and the generated at least one definition on at least one server. The method may also include determining whether the received at least one request is a request for deleting at least one second name and at least one second definition for a second group of serialized tokens. The method may further include, in response to the determination that the received at least one request is a request to delete the at least one second name and the at least one second definition for the second group of serialized tokens, deleting the at least one second name and the at least one second definition for the second group of serialized tokens from the at least one server. The method may also include determining whether the received at least one request is a request for receiving the second group of serialized tokens based on the at least one second name and the at least one second definition. The method may further include, in response to the determination that the received at least one request is a request for receiving the second group of serialized tokens, formatting and distributing the second group of serialized tokens based on the at least one second name and the at least one second definition. The method may also include sending a response to the client based on the received at least one request.

A computer program product for enabling at least one user interface display field to perform at least one action is provided. The computer program product may include one or more computer-readable storage devices and program instructions stored on at least one of the one or more tangible storage devices, the program instructions executable by a processor. The computer program product may include program instructions to receive at least one request from at least one client. The computer program product may also include program instructions to determine whether the received at least one request is a request for generating at least one name and at least one definition for a group of serialized tokens. The computer program product may further include, in response to the determination that the received at least one request is a request for generating the at least one name and the at least one definition for the group of serialized tokens, program instructions to enable the at least one client to generate the at least one name and the at least one definition for the group of serialized tokens. Additionally, the computer program product may include program instructions to store the generated at least one name and the generated at least one definition on at least one server. The computer program product may also include program instructions to determine whether the received at least one request is a request for deleting at least one second name and at least one second definition for a second group of serialized tokens. The computer program product may further include, in response to the determination that the received at least one request is a request to delete the at least one second name and the at least one second definition for the second group of serialized tokens, program instructions to delete the at least one second name and the at least one second definition for the second group of serialized tokens from the at least one server. The computer program product may also include program instructions to determine whether the received at least one request is a request for receiving the second group of serialized tokens based on the at least one second name and the at least one second definition. The computer program product may further include, in response to the determination that the received at least one request is a request for receiving the second group of serialized tokens, program instructions to format and distribute the second group of serialized tokens based on the at least one second name and the at least one second definition. The computer program product may further include program instructions to send a response to the client based on the received at least one request.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
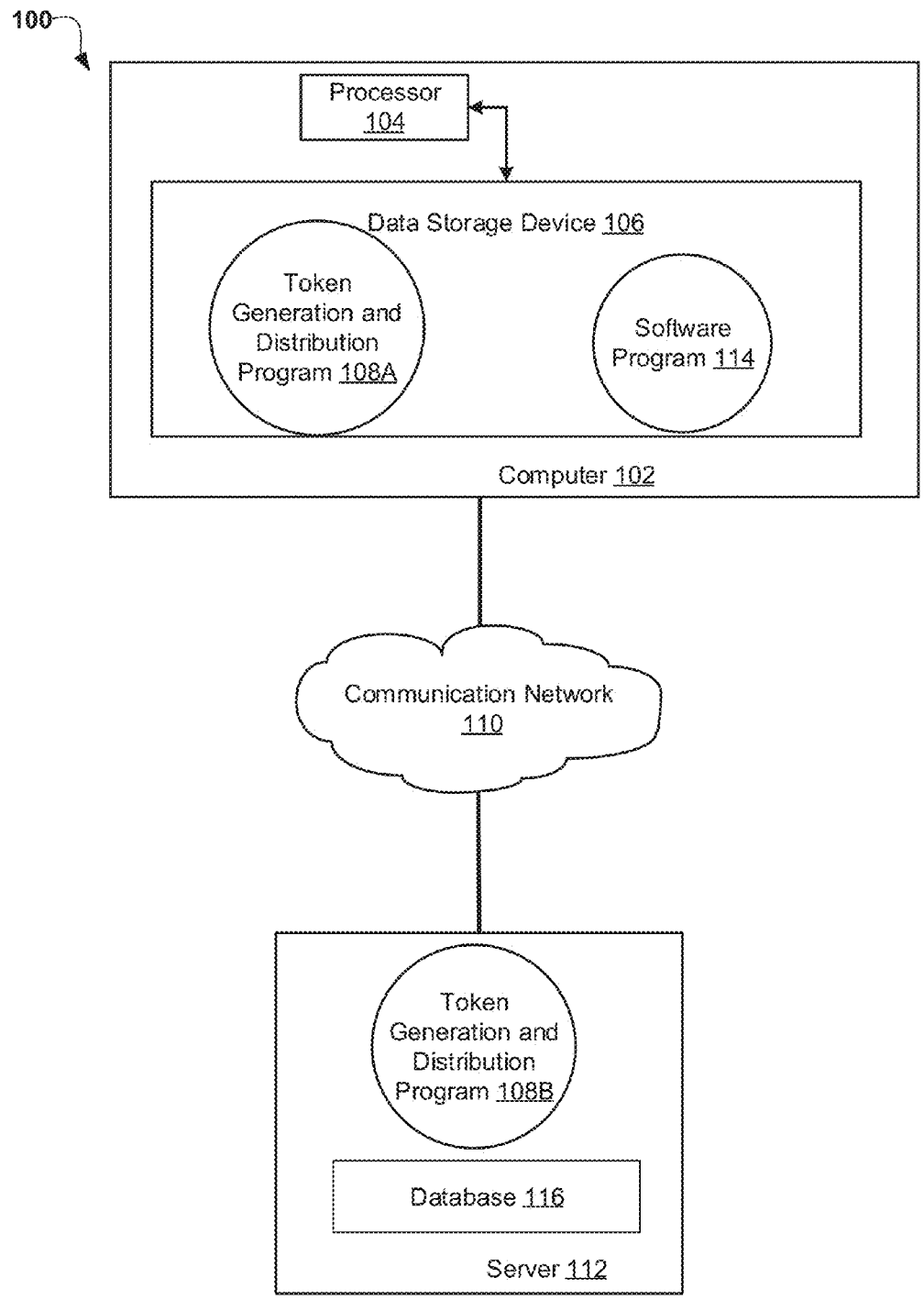
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to serialized tokens. The following described exemplary embodiments provide a system, method and program product for generating and distributing serialized tokens. Therefore, the present embodiment has the capacity to improve the technical field associated with serialized tokens by enabling clients to name and define serialized tokens. Specifically, the present embodiment may enable clients, instead of servers, to name and define the format for serialized tokens, store the named and defined format for the serialized tokens on servers, and request distribution of the named and defined serialized tokens on demand based on the format definitions.

As previously described with respect to serialized tokens, servers commonly dictate set formats for generating serialized tokens and incrementally distributing the serialized tokens at clients' requests. However, having servers dictate the generation and distribution of serialized tokens is limiting. Certain aspects, such as the life-cycle of the serialized token, may be controlled by the server. Furthermore, applications may have code for token generation and supply, which means that the same sort of code may be written over and over. However, the required format generated by the server may be different. As such, it may be advantageous, among other things, to provide a system, method and program product for enabling client-side devices to generate and control distribution of serialized tokens. Specifically, the system, method and program product may enable clients to name formats associated with serialized tokens so that the number of potential formats is only limited by the possible number of names, control the format of the serialized tokens consumed by the clients, control the life-cycle of serialized tokens, and create different formats for serialized tokens.

According to at least one implementation of the present embodiment, requests for serialized tokens may be received. Next, whether the received requests are for creating names and definitions for serialized tokens may be determined. Then, if the received requests are for creating names and definitions for serialized tokens, the clients may create the names and definitions for serialized tokens and store the names and definitions on server databases. Next, if the received requests are not for creating names and definitions for serialized tokens, whether the received requests are for deleting names and definitions for serialized tokens may be determined. Then, if the received requests are for deleting the names and definitions for serializes tokens, the stored names and definitions for serialized tokens on the server databases may be deleted. Next, if the received requests are not for deleting the names and definitions for serialized tokens, whether the received requests are for requesting serialized tokens based on the names and definitions may be determined. Then, if the received requests are for requesting serialized tokens based on the names and definitions, the stored names may be read and the serialized tokens may be formatted and retrieved based on the stored definitions. Next, replies may be sent according to the performed action.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for generating and distributing serialized tokens.

According to at least one implementation, requests for serialized tokens may be received. Next, whether the received requests are for creating names and definitions for serialized tokens may be determined. Then, if the received requests are for creating names and definitions for serialized tokens, the clients may create the names and definitions for serialized tokens and store the names and definitions on server databases. Next, if the received requests are not for creating names and definitions for serialized tokens, whether the received requests are for deleting names and definitions for serialized tokens may be determined. Then, if the received requests are for deleting the names and definitions for serializes tokens, the stored names and definitions for serialized tokens on the server databases may be deleted. Next, if the received requests are not for deleting the names and definitions for serialized tokens, whether the received requests are for requesting serialized tokens based on the names and definitions may be determined. Then, if the received requests are for requesting serialized tokens based on the names and definitions, the stored names may be read and the serialized tokens may be formatted and retrieved based on the stored definitions. Next, replies may be sent according to the performed action.

Referring now to FIG. 1, an exemplary networked computer environment 100 in accordance with one embodiment is depicted. The networked computer environment 100 may include a computer 102 with a processor 104 and a data storage device 106 that is enabled to run a token generation and distribution program 108A and a software program 114. The software program 114 may be an application program such as an internet browser and an email program. The token generation and distribution program 108A may communicate with the software program 114. The networked computer environment 100 may also include a server 112 that is enabled to run a token generation and distribution program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the token generation and distribution program 108A, 108B may interact with a database 116 that may be embedded in various storage devices, such as, but not limited to a mobile device 102, a networked server 112, or a cloud storage service.

According to the present embodiment, a program, such as a token generation and distribution program 108A and 108B may run on the client computer 102 or on the server computer 112 via a communications network 110. The token generation and distribution program 108A, 108B may enable clients to control the generation and formatting of serialized tokens. Specifically, a user using a computer, such as computer 102, may run a token generation and distribution program 108A, 108B, that interacts with a software program 114, such as a web browser, to enable clients to create serialized tokens by naming and defining serialized tokens, and storing the created names and definitions associated with the serialized tokens on servers for retrieval at client requests.

Figure 2:
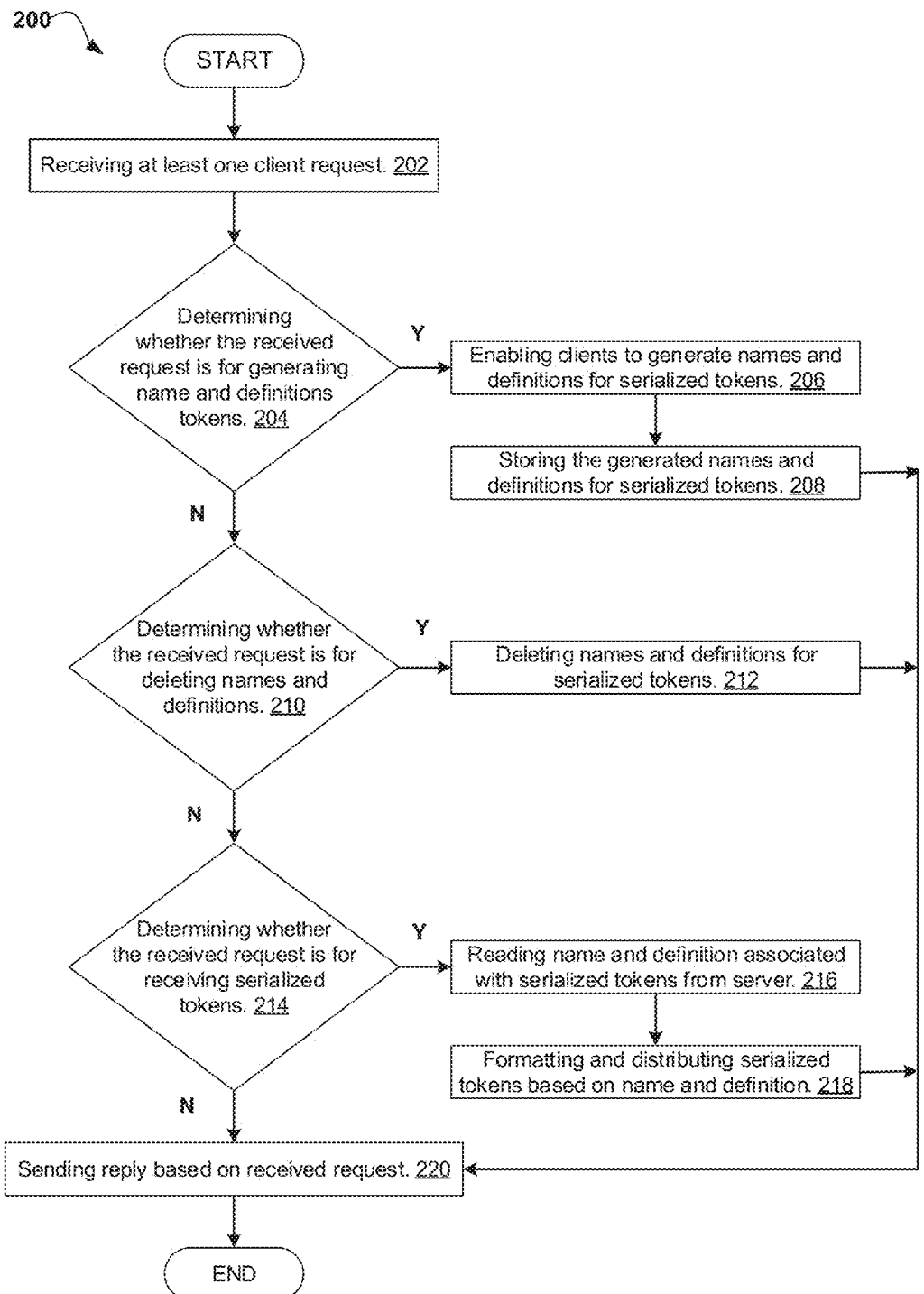
FIG. 2 is an operational flowchart illustrating the steps carried out by a program for generating and distributing serialized tokens according to one embodiment.

Referring now to FIG. 2, an operational flowchart 200 illustrating the steps carried out by a program for generating and distributing serialized tokens is depicted. At 202, the token generation and distribution program 108A, 108B (FIG. 1) may receive client requests. Specifically, the token generation and distribution program 108A, 108B (FIG. 1) may receive client requests to create names and definitions for serialized tokens, delete the names and definitions associated with serialized tokens, and/or receive named and defined serialized tokens. For example, the token generation and distribution program 108A, 108B (FIG. 1) may receive HTTP RESTful API requests from client applications to name and define serialized tokens.

Next, at 204, the token generation and distribution program 108A, 108B (FIG. 1) may determine whether the received requests are for creating names and definitions for serialized tokens. As previously described at step 202, the token generation and distribution program 108A, 108B (FIG. 1) may receive client requests to create names and definitions for serialized tokens. For example, the token generation and distribution program 108A, 108B (FIG. 1) may receive HTTP RESTful API requests from a client application to create names and definitions for serialized tokens associated with the world wide web. Therefore, the token generation and distribution program 108A, 108B (FIG. 1) may determine that the received requests are to create names and definitions for serialized tokens.

Then, at 206, the token generation and distribution program 108A, 108B (FIG. 1) may enable clients to create the names and definitions for the serialized tokens. Specifically, according to one embodiment, the token generation and distribution program 108A, 108B (FIG. 1) may receive the format for distributing serialized tokens by enabling clients to create names and definitions for serialized tokens. For example, the token generation and distribution program 108A, 108B (FIG. 1) may receive names and definitions for serialized tokens via JavaScript Object Notation (JSON) data and/or Extensive Markup Language (XML) data. Furthermore, the token generation and distribution program 108A, 108B (FIG. 1) may enable users to create names for serialized tokens, such as naming the serialized tokens as MY_SERIALIZED_TOKENS, and may enable users to create definitions for the name MY_SERIALIZED_TOKENS, such as defining MY_SERIALIZED_TOKENS as LITERAL-AA-0000 to LITERAL ZZ-9999, where 0000-9999 is a first counter and AA-ZZ is a second counter, and the first counter and the second counter determine the order of distribution for the serialized tokens. Thus, according to the previous example, the token generation and distribution program 108A, 108B (FIG. 1) may distribute the serialized tokens based on the created definition by incrementing the first counter 0000-9999 in the order defined by users, then incrementing the second counter AA-ZZ in the order defined by users.

For example, the token generation and distribution program 108A, 108B (FIG. 1) may increment the first counter 0000-9999 by 1 up to 9999 (i.e. 0001, 0002, 0003 . . . NNNN), then increment the second counter AA by 1 up to ZZ (i.e. AA, AB, AC . . . ). Therefore, the token generation and distribution program 108A, 108B (FIG. 1) may determine that the first counter 0000-9999 has a min value of 0000 and a max value of 9999, and that the second counter has a min value of 0 and a max value of 675 (i.e. based on 26 letters in the alphabet, calculated as 26*26−1). Furthermore, the token generation and distribution program 108A, 108B (FIG. 1) may determine that the number of counting positions used by the first counter 0000-9999 is 4 (i.e. 4 numbers are used by the first counter to increment by 1) and the number of counting positions used by the second counter AA-ZZ is 2 (i.e. 2 letters are used by the second counter to increment by 1). Additionally, the token generation and distribution program 108A, 108B (FIG. 1) may determine that the symbols used for the first counter are 0, 1, 2, 3, 4, 5, 6, 7, 8, 9, and that the symbols used by the second counter are A, B, C, D, E, F, G, H, I, J, K, L, M, N, O, P, Q, R, S, T, U, V, W, X, Y, Z. Thus, according to the previous example, the token generation and distribution program 108A, 108B (FIG. 1) may enable users to generate pseudocode for creating names and definitions for serialized tokens, such as:

HTTP POST define MY_SERIALIZED_TOKEN as LITERAL-C2-C1
C1 min=0, max=9999, inc=1, places=4,
symbols={0, 1, 2, 3, 4, 5, 6, 7, 8, 9}
C2 min=0, max=675, inc=1, places=2,
symbols={A, B, C, D, E, F, G, H, I, J, K, L, M, N, O, P, Q, R, S, T, U, V, W, X, Y, Z}.

Also, according to one embodiment, the token generation and distribution program 108A, 108B (FIG. 1) may enable users to create non-numeric definitions for serialized tokens. For example, the token generation and distribution program 108A, 108B (FIG. 1) may enable users to name serialized tokens as BEATLES, and may enable users to create definitions for the serialized tokens BEATLES by using 4 unique IDs, such as JOHN, PAUL, GEORGE, RINGO. Furthermore, the token generation and distribution program 108A, 108B (FIG. 1) may enable users to increment BEATLES by 1 from JOHN to RINGO in the order of JOHN, PAUL, GEORGE, RINGO. Therefore, according to the previous example, the token generation and distribution program 108A, 108B (FIG. 1) may enable users to generate pseudocode for naming and defining the non-numeric serialized tokens such as:

HTTP POST define BEATLES as C1
C1 min=0, max=3, inc=1, places=1,
symbols={'JOHN','PAUL','GEORGE','RINGO'}.

Then, at 208, the token generation and distribution program 108A, 108B (FIG. 1) may store the created names and definitions for serialized tokens on server databases. As previously described at step 204, the token generation and distribution program 108A, 108B (FIG. 1) may determine whether the received requests are for creating names and definitions for serialized tokens, and if so, the token generation and distribution program 108A, 108B (FIG. 1) may enable users to create the names and definitions for the serialized tokens at step 206. For example, and as previously described at step 204, the token generation and distribution program 108A, 108B (FIG. 1) may enable users to create MY_SERIALIZED_TOKENS, and may enable users to define MY_SERIALIZED_TOKENS as LITERAL-AA-0000 to LITERAL ZZ-9999. As such, the token generation and distribution program 108A, 108B (FIG. 1) may receive the created names and definitions for serialized tokens, then may store the received names and definitions for serialized tokens on server databases for retrieval at clients' requests.

Next, at 210, the token generation and distribution program 108A, 108B (FIG. 1) may determine whether the received client requests are to delete the names and definitions associated with the serialized tokens. Specifically, if the token generation and distribution program 108A, 108B (FIG. 1) determines that the received clients requests are not for creating names and definitions for serialized tokens at step 204, the token generation and distribution program 108A, 108B (FIG. 1) may determine whether the client requests are for deleting the names and definitions associated with serialized tokens. For example, the token generation and distribution program 108A, 108B (FIG. 1) may have enabled users to create names and definitions for the serialized tokens named BEATLES. Then, the token generation and distribution program 108A, 108B (FIG. 1) may receive a client request to delete the serialized tokens associated with the name BEATLES.

Then, at 212, the token generation and distribution program 108A, 108B (FIG. 1) may delete the names and definitions associated with the serialized tokens from the server databases. As previously described at step 208, the token generation and distribution program 108A, 108B (FIG. 1) may store names and definitions associated with serialized tokens on server databases. For example, the token generation and distribution program 108A, 108B (FIG. 1) may have stored the names and definitions associated with the serialized tokens named MY_SERIALIZED_TOKENS. Then, as previously described at step 210, the token generation and distribution program 108A, 108B (FIG. 1) may determine that a received client request, such as HTTP DELETE MY_SERIALIZED_TOKEN, is a request for the server to delete the stored name and definition associated with the serialized tokens named MY_SERIALIZED_TOKENS. Therefore, the token generation and distribution program 108A, 108B (FIG. 1) may delete the stored name MY_SERIALIZED_TOKENS and the definitions associated with the stored name MY_SERIALIZED_TOKENS from the server databases.

Next, at 214, the token generation and distribution program 108A, 108B (FIG. 1) may determine whether the received client requests are requests to receive serialized tokens. Specifically, if the token generation and distribution program 108A, 108B (FIG. 1) determines that the received clients requests are not for generating named and defined serialized tokens at step 204, and not for deleting the named and defined serialized tokens at step 210, the token generation and distribution program 108A, 108B (FIG. 1) may determine whether the received clients requests are requests to receive serialized tokens based on the names and definitions. As previously described at step 208, the token generation and distribution program 108A, 108B (FIG. 1) may store the names and definitions associated with serialized tokens. As such, the token generation and distribution program 108A, 108B (FIG. 1) may enable clients to use serialized tokens by receiving requests to receive serialized tokens based on the names and definitions. For example, the token generation and distribution program 108A, 108B (FIG. 1) may store the names and definitions for serialized tokens, such as the name MY_SERIALIZED_TOKENS, and the definition LITERAL-AA-0000 to LITERAL ZZ-9999. Then, at step 214, the token generation and distribution program 108A, 108B (FIG. 1) may determine that the received client request, such as HTTP GET MY_SERIALIZED_TOKEN, is a request to receive serialized tokens based on the name MY_SERIALIZED_TOKENS and the definition LITERAL-AA-0000 to LITERAL ZZ-9999.

As such, at step 216, the token generation and distribution program 108A, 108B (FIG. 1) may read the stored name and definition from the server databases. Thus, according to the previous example, based on the received client request, the token generation and distribution program 108A, 108B (FIG. 1) may read the stored definition name MY_SERIALIZED_TOKENS.

Then, at step 218, the token generation and distribution program 108A, 108B (FIG. 1) may format and distribute the requested serialized tokens according to the stored name and definition. Specifically, the token generation and distribution program 108A, 108B (FIG. 1) may format and distribute serialized tokens to the requesting clients based on the created names and definitions. Therefore, based on the previous example, the token generation and distribution program 108A, 108B (FIG. 1) may read the stored name MY_SERIALIZED_TOKENS, then may format and distribute MY_SERIALIZED_TOKENS based on the definition LITERAL-AA-0000 to LITERAL ZZ-9999.

For example, the token generation and distribution program 108A, 108B (FIG. 1) may determine that the client requests the next 3 serialized tokens associated with the created name MY_SERIALIZED_TOKENS. Furthermore, the token generation and distribution program 108A, 108B (FIG. 1) may determine that the next 3 serialized tokens associated with the created name MY_SERIALIZED_TOKENS, and distributed based on the definition LITERAL-AA-0000 to LITERAL ZZ-999, are LITERAL-AA-0056, LITERAL-AA-0057, and LITERAL-AA-0058. Therefore, the token generation and distribution program 108A, 108B (FIG. 1) may format the serialized tokens based on the created name and definition by receiving the determined next 3 serialized tokens associated with MY_SERIALIZED_TOKENS, as well as bookmarking the counting position of the first counter and the second counter (i.e. determining where the counter left off, which, for this example, is at LITERAL-AA-0059).

Then, at 220, the token generation and distribution program 108A, 108B (FIG. 1) may send responses based on the received client requests. Specifically, the token generation and distribution program 108A, 108B (FIG. 1) may send responses based on the determinations made at steps 204, 210, and 214. For example, as previously described at step 204, the token generation and distribution program 108A, 108B (FIG. 1) may receive requests for creating names and definitions for serialized tokens, may enable clients to create the names and definitions, and may store the created names and definitions on server databases at step 208. Therefore, the token generation and distribution program 108A, 108B (FIG. 1) may send a response indicating that the user's names and definitions for serialized tokens are generated and stored. Also, for example, and as previously described at step 210, the token generation and distribution program 108A, 108B (FIG. 1) may receive client requests to delete created names and definitions for serialized tokens, and may delete the names and definitions for serialized tokens at step 212. Therefore, the token generation and distribution program 108A, 108B (FIG. 1) may send a response indicating that the created names and definitions for serialized token are deleted. Furthermore, for example, and as previously described at step 214, the token generation and distribution program 108A, 108B (FIG. 1) may receive client requests to receive serialized tokens based on created names and definitions. Therefore, the token generation and distribution program 108A, 108B (FIG. 1) may send a response that may include the requested serialized tokens according to the created name and definition.

It may be appreciated that FIG. 2 provide only illustrations of one implementation and does not imply any limitations with regard to how different embodiments may be implemented. Many modifications to the depicted environments may be made based on design and implementation requirements. According to one embodiment, in step 220, the token generation and distribution program 108A, 108B (FIG. 1) may send error messages as responses to users. For example, the token generation and distribution program 108A, 108B (FIG. 1) may receive client requests to receive serialized tokens named MY_SERIALIZED_TOKENS. However, MY_SERIALIZED_TOKENS may not have remaining serialized tokens. Also, for example, the token generation and distribution program 108A, 108B (FIG. 1) may receive a request for creating serialized tokens named MY_SERIALIZED_TOKENS. However, the name MY_SERIALIZED_TOKENS may already be in use. Thus, in the first example, the token generation and distribution program 108A, 108B (FIG. 1) may send an error message as a response indicating that there are no more serialized tokens according to the definition associated with the name MY_SERIALIZED_TOKENS. Furthermore, in the second example, the token generation and distribution program 108A, 108B (FIG. 1) may send an error message as a response indicating that the name MY_SERIALIZED_TOKENS is already in use.

Figure 3:
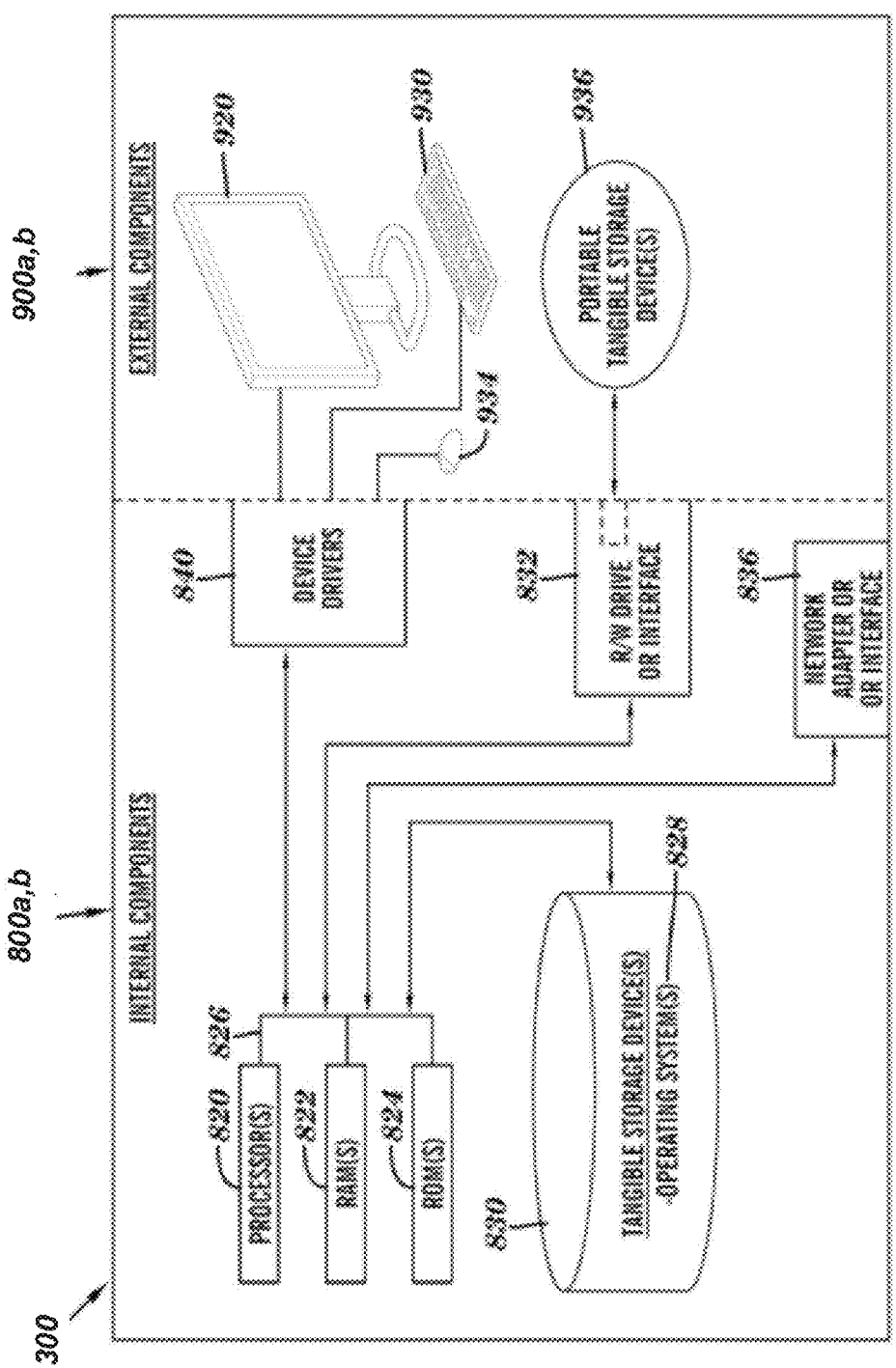
FIG. 3 is a block diagram of the system architecture of a program for generating and distributing serialized tokens according to one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800*a*, *b* and external components 900*a*, *b* illustrated in FIG. 3. Each of the sets of internal components 800*a*, *b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, the software program 114 (FIG. 1), the token generation and distribution program 108A (FIG. 1) in client computer 102 (FIG. 1), and the token generation and distribution program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a*, *b*, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as a token generation and distribution program 108A and 108B (FIG. 1), can be stored on one or more of the respective portable computer-readable tangible storage devices 936, read via the respective R/W drive or interface 832 and loaded into the respective hard drive 830.

Each set of internal components 800*a*, *b* also includes network adapters or interfaces 836 such as a TCP/IP adapter cards, wireless Wi-Fi interface cards, or 3G or 4G wireless interface cards or other wired or wireless communication links. The token generation and distribution program 108A (FIG. 1) and software program 114 (FIG. 1) in client computer 102 (FIG. 1), and the token generation and distribution program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the token generation and distribution program 108A (FIG. 1) and software program 114 (FIG. 1) in client computer 102 (FIG. 1) and the token generation and distribution program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900*a*, *b* can include a computer display monitor 920, a keyboard 930, and a computer mouse 934. External components 900*a*, *b* can also include touch screens, virtual keyboards, touch pads, pointing devices, and other human interface devices. Each of the sets of internal components 800*a*, *b* also includes device drivers 840 to interface to computer display monitor 920, keyboard 930, and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
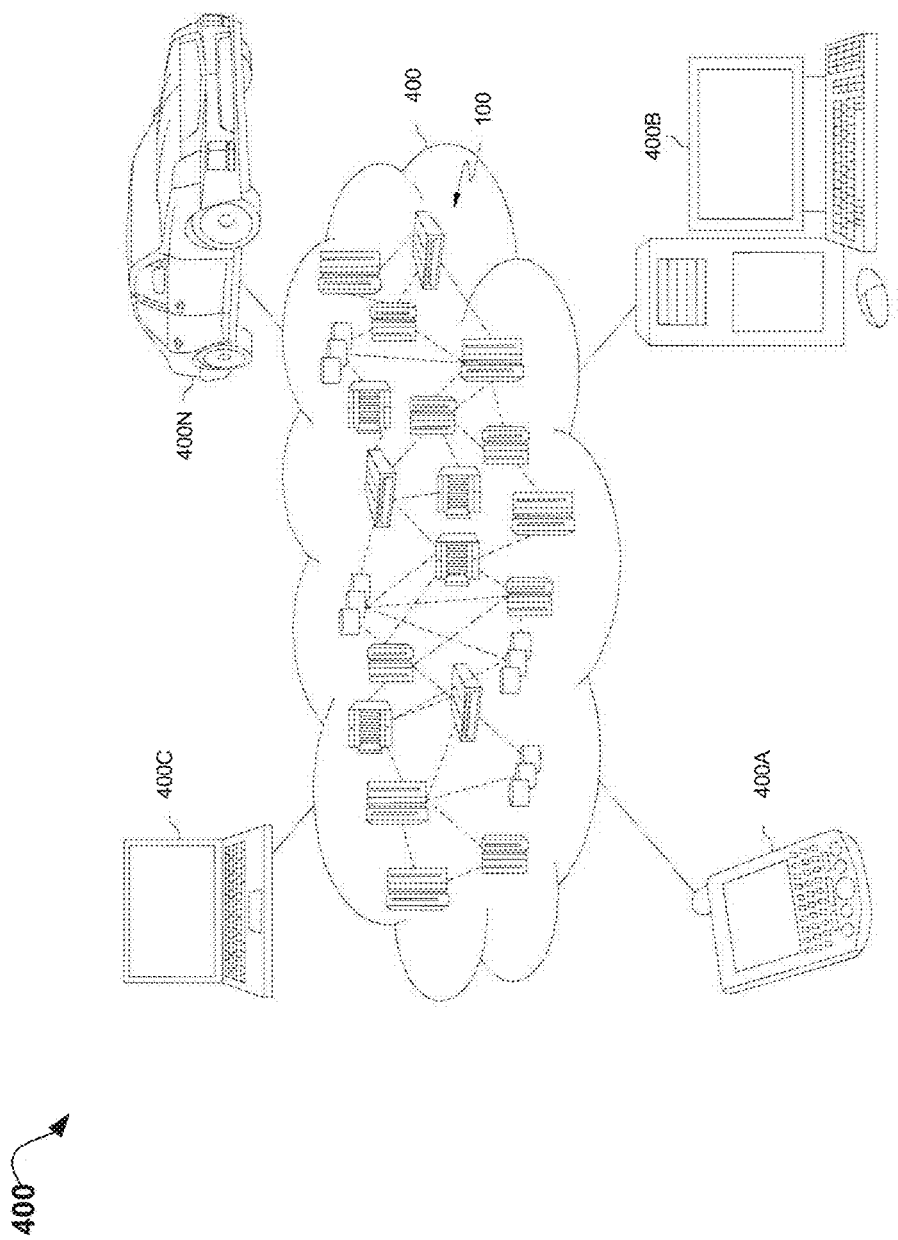
FIG. 4 is a block diagram of an illustrative cloud computing environment including the computer system depicted in FIG. 1, in accordance with an embodiment of the present disclosure.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
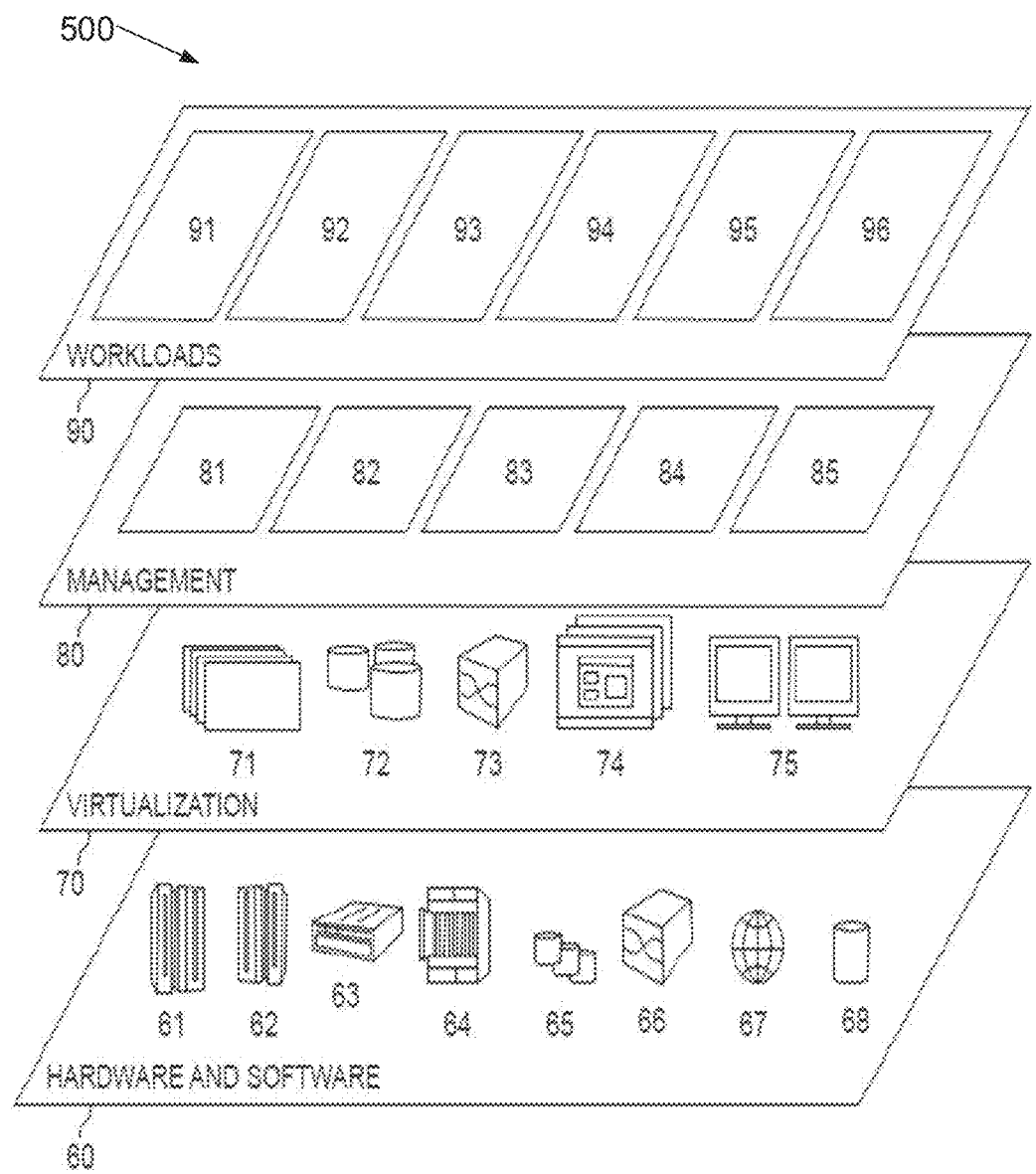
FIG. 5 is a block diagram of functional layers of the illustrative cloud computing environment of FIG. 4, in accordance with an embodiment of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Token Generation and Distribution 96. A Token Generation and Distribution Program 108A, 108B (FIG. 1) may be offered "as a service in the cloud" (i.e., Software as a Service (SaaS)) for applications running on mobile devices 102 (FIG. 1) and may generate and distribute serialized tokens based on client input.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating and distributing a plurality of serialized tokens, the method comprising:
    receiving at least one request from at least one client;
    determining whether the received at least one request is a request for generating at least one name and at least one definition for a group of serialized tokens;
    in response to the determination that the received at least one request is a request for generating the at least one name and the at least one definition for the group of serialized tokens, enabling the at least one client to generate the at least one name and the at least one definition for the group of serialized tokens;
    storing the generated at least one name and the generated at least one definition on at least one server;
    determining whether the received at least one request is a request for deleting at least one second name and at least one second definition for a second group of serialized tokens;
    in response to the determination that the received at least one request is a request to delete the at least one second name and the at least one second definition for the second group of serialized tokens, deleting the at least one second name and the at least one second definition for the second group of serialized tokens from the at least one server;
    determining whether the received at least one request is a request for receiving the second group of serialized tokens based on the at least one second name and the at least one second definition;

in response to the determination that the received at least one request is a request for receiving the second group of serialized tokens, formatting and distributing the second group of serialized tokens based on the at least one second name and the at least one second definition; and sending a response to the client based on the received at least one request.

2. The method of claim 1, wherein the received at least one request comprises a plurality of data selected from a group comprising JavaScript Object Notation (JSON) data and Extensible Markup Language (XML).

3. The method of claim 1, wherein the generated at least one definition comprises at least one counter to determine a sequence to distribute the group of serialized tokens.

4. The method of claim 1, wherein the generated at least one name and the generated at least one definition comprises a plurality of symbols selected from a group comprising a plurality of numeric symbols and a plurality of non-numeric symbols.

5. The method of claim 1, wherein formatting and distributing the second group of serialized tokens further comprises:
bookmarking a position of at least one counter to determine a next available serialized token associated with the second group of serialized tokens.

6. The method of claim 1, wherein sending the response to the client comprises sending at least one of an indication that the generated at least one name and the generated at least one definition are generated and stored, a confirmation that the at least one second name and the at least one second definition for a second group of serialized tokens are deleted, at least one serialized token, and an error message.

7. The method of claim 6, wherein the error message is selected from a group comprising an indication that a plurality of serialized tokens associated with the second group of serialized tokens do not remain, and an indication that a name associated with the group of serialized tokens is in use.

8. A computer system for generating and distributing a plurality of serialized tokens, comprising:
one or more processors, one or more computer-readable memories, one or more computer-readable storage devices, and program instructions stored on at least one of the one or more computer-readable storage devices for execution by at least one of the one or more processors via at least one of the one or more memories, wherein the computer system is capable of performing a method comprising:
receiving at least one request from at least one client;
determining whether the received at least one request is a request for generating at least one name and at least one definition for a group of serialized tokens;
in response to the determination that the received at least one request is a request for generating the at least one name and the at least one definition for the group of serialized tokens, enabling the at least one client to generate the at least one name and the at least one definition for the group of serialized tokens;
storing the generated at least one name and the generated at least one definition on at least one server;
determining whether the received at least one request is a request for deleting at least one second name and at least one second definition for a second group of serialized tokens;
in response to the determination that the received at least one request is a request to delete the at least one second name and the at least one second definition for the second group of serialized tokens, deleting the at least one second name and the at least one second definition for the second group of serialized tokens from the at least one server;
determining whether the received at least one request is a request for receiving the second group of serialized tokens based on the at least one second name and the at least one second definition;
in response to the determination that the received at least one request is a request for receiving the second group of serialized tokens, formatting and distributing the second group of serialized tokens based on the at least one second name and the at least one second definition; and sending a response to the client based on the received at least one request.

9. The computer system of claim 8, wherein the received at least one request comprises a plurality of data selected from a group comprising JavaScript Object Notation (JSON) data and Extensible Markup Language (XML).

10. The computer system of claim 8, wherein the generated at least one definition comprises at least one counter to determine a sequence to distribute the group of serialized tokens.

11. The computer system of claim 8, wherein the generated at least one name and the generated at least one definition comprises a plurality of symbols selected from a group comprising a plurality of numeric symbols and a plurality of non-numeric symbols.

12. The computer system of claim 8, wherein formatting and distributing the second group of serialized tokens further comprises:
bookmarking a position of at least one counter to determine a next available serialized token associated with the second group of serialized tokens.

13. The computer system of claim 8, wherein sending the response to the client comprises sending at least one of an indication that the generated at least one name and the generated at least one definition are generated and stored, a confirmation that the at least one second name and the at least one second definition for a second group of serialized tokens are deleted, at least one serialized token, and an error message.

14. The computer system of claim 13, wherein the error message is selected from a group comprising an indication that a plurality of serialized tokens associated with the second group of serialized tokens do not remain, and an indication that a name associated with the group of serialized tokens is in use.

15. A computer program product for generating and distributing a plurality of serialized tokens, comprising:
one or more computer-readable storage devices and program instructions stored on at least one of the one or more computer-readable storage devices, the program instructions executable by a processor, the program instructions comprising:
program instructions to receive at least one request from at least one client;
program instructions to determine whether the received at least one request is a request for generating at least one name and at least one definition for a group of serialized tokens;
in response to the determination that the received at least one request is a request for generating the at least one name and the at least one definition for the group of serialized tokens, program instructions to enable the at least one client to generate the at least one name and the at least one definition for the group of serialized tokens;

program instructions to store the generated at least one name and the generated at least one definition on at least one server;

program instructions to determine whether the received at least one request is a request for deleting at least one second name and at least one second definition for a second group of serialized tokens;

in response to the determination that the received at least one request is a request to delete the at least one second name and the at least one second definition for the second group of serialized tokens, program instructions to delete the at least one second name and the at least one second definition for the second group of serialized tokens from the at least one server;

program instructions to determine whether the received at least one request is a request for receiving the second group of serialized tokens based on the at least one second name and the at least one second definition;

in response to the determination that the received at least one request is a request for receiving the second group of serialized tokens, program instructions to format and distribute the second group of serialized tokens based on the at least one second name and the at least one second definition; and sending a response to the client based on the received at least one request.

16. The computer program product of claim 15, wherein the generated at least one definition comprises at least one counter to determine a sequence to distribute the group of serialized tokens.

17. The computer program product of claim 15, wherein the generated at least one name and the generated at least one definition comprises a plurality of symbols selected from a group comprising a plurality of numeric symbols and a plurality of non-numeric symbols.

18. The computer program product of claim 15, wherein the program instructions to format and distribute the second group of serialized tokens further comprises:
program instructions to bookmark a position of at least one counter to determine a next available serialized token associated with the second group of serialized tokens.

19. The computer program product of claim 15, wherein the program instructions to send the response to the client comprises sending at least one of an indication that the generated at least one name and the generated at least one definition are generated and stored, a confirmation that the at least one second name and the at least one second definition for a second group of serialized tokens are deleted, at least one serialized token, and an error message.

20. The computer program product of claim 19, wherein the error message is selected from a group comprising an indication that a plurality of serialized tokens associated with the second group of serialized tokens do not remain, and an indication that a name associated with the group of serialized tokens is in use.

* * * * *